United States Patent [19]

Mitchell et al.

[11] Patent Number: 5,027,570

[45] Date of Patent: Jul. 2, 1991

[54] BRACE FOR A MODIFIED VAN WALL

[76] Inventors: David Mitchell, 20387 Wallace, Roseville, Mich. 48066; Theodore W. Piotrowski, 2600 Fox Rd., Emmett, Mich. 48022

[21] Appl. No.: 585,609

[22] Filed: Sep. 20, 1990

[51] Int. Cl.$^5$ .............................................. E06B 1/04
[52] U.S. Cl. ...................................... 52/210; 296/203
[58] Field of Search .......................... 296/187, 203, 30; 52/210

[56] References Cited

U.S. PATENT DOCUMENTS

| | | | |
|---|---|---|---|
| 1,748,794 | 2/1930 | Ray | 52/210 |
| 2,716,261 | 8/1955 | Huffman | 52/210 |
| 3,851,372 | 12/1974 | Wirch | 52/210 X |
| 4,235,054 | 11/1980 | Cable et al. | 52/210 |

Primary Examiner—Margaret A. Focarino
Assistant Examiner—Gary C. Hoge
Attorney, Agent, or Firm—Peter D. Keefe

[57] ABSTRACT

A van wall brace for reinforcing a truncated pillar of a van wall which has been cut in order to accommodate a retrofitted window. The van wall brace connects to the severed end of truncated pillar and is tied into adjacent intact pillars so as to lend structural integrity to the truncated pillar, thereby restoring strength to the van wall. The van wall brace is preferred to be formed of a single piece of heavy gauge sheet metal stock of elongate shape. Each end of the sheet metal stock is stamped with a predetermined reciprocal pillar contour or contours for engaging the intact pillars located on either side of the truncated pillar or pillars. The sheet steel stock is further stamped between the ends thereof so as to provide another predetermined reciprocal pillar contour or contours for engaging each truncated pillar or pillars. The stamping location of each reciprocal pillar contour is predetermined so that the completed van wall brace will engage each of the aforesaid pillars of the particular van that has been modified. Between each of the aforesaid reciprocal pillar contours the sheet metal stock is preferred to be stamped to include edge flanges, thereby providing high strength against bending. The van wall brace is secured to the aforesaid pillars either by a standard fastener or by welding.

7 Claims, 2 Drawing Sheets

BRACE FOR A MODIFIED VAN WALL

BACKGROUND OF THE INVENTION

1. Field of the Invention

The present invention is related to braces used to rigidify structural members, and particularly to a brace which ties together pillars of a van wall where one or more of the pillars has been truncated in the process of modifying the van wall, such as when a window has been retrofitted thereinto.

2. Description of the Prior Art

Van conversions have become increasingly popular with the driving public. A van conversion is a general term applied to the process of converting a standard factory manufactured van to a specialty purpose, most typically for recreation.

When a van conversion is performed, a frequent modification is to add a side window into the sheet metal wall of the van. This gives an airy and open feeling to the occupants of the van. Problematically, though, the window is cut into not only the sheet metal of the wall but also cut into one or more pillars connected with the van wall. It is common practice in the art to cut these pillars without subsequently reinforcing them in any way. This results in a weakened van wall.

Accordingly, what is needed in the art is a means of reinforcing the truncated pillars, the means being both structurally sound and easy to install.

SUMMARY OF THE INVENTION

The present invention is a van wall brace for reinforcing one or more truncated pillars of a van wall which have been cut in order to accommodate a retrofitted window. The van wall brace connects to the severed end of the one or more truncated pillars and is tied into adjacent intact pillars. Accordingly, the adjacent intact pillars lend structural integrity to the one or more truncated pillars, thereby restoring strength to the van wall.

The van wall brace according to the present invention is preferred to be formed of an elongate member constructed of a single piece of heavy gauge sheet metal stock. Each end of the elongate member is stamped with a predetermined shape which is reciprocal to the contour or contours of the exposed sides of the intact pillars for engaging the intact pillars located on either side of the truncated pillar or pillars. The elongate member is further stamped between the ends thereof so as to provide another predetermined shape which is reciprocal to the contour or contours of all the exposed sides of the one or more truncated pillars for engaging each truncated pillar or pillars. The stamping location of each pillar reciprocal contour is predetermined so that the completed van wall brace will engage each of the aforesaid pillars of the selected van. Between each of the aforesaid pillar reciprocal contours, the elongate member is preferred to be stamped to include edge flanges, thereby providing high strength against bending. It is preferred to weld the ends of each edge flange to its adjoining pillar reciprocal contours and to secure the van wall brace to the aforesaid pillars either by a standard fastener or by welding. It is preferred further that the elongate member between each pillar reciprocal contour abuts the van wall, with a resilient material being located therebetween.

Accordingly, it is an object of the present invention to provide a van wall brace for a modified van wall which has been apertured by cutting of the van wall, the van wall brace engaging each truncated pillar and further engaging each adjacent uncut pillar, thereby strengthening the van wall.

It is a further object of the present invention to provide a simple, inexpensive, easily mounted van wall brace for truncated pillars.

It is yet an additional object of the present invention to provide a van wall brace for reinforcing one or more truncated pillars in which the brace is formed of a single piece of elongate sheet metal stock having stamped therein contours shaped reciprocal to the contours of the exposed sides of the pillars for engaging the one or more truncated pillars and each adjacent uncut pillar.

It is another object of the present invention to provide a van wall brace for reinforcing one or more truncated pillars in which the brace is formed of a single piece of elongate sheet metal stock having stamped therein contours shaped reciprocal to the contours of the exposed sides of the pillars for engaging the one or more truncated pillars and each adjacent uncut pillar, and further having stamped edge flanges between each of the pillar reciprocal contours.

These, and additional objects, advantages, features and benefits of the present invention will become apparent from the following specification.

DETAILED DESCRIPTION OF THE PREFERRED EMBODIMENT

Figure 1:
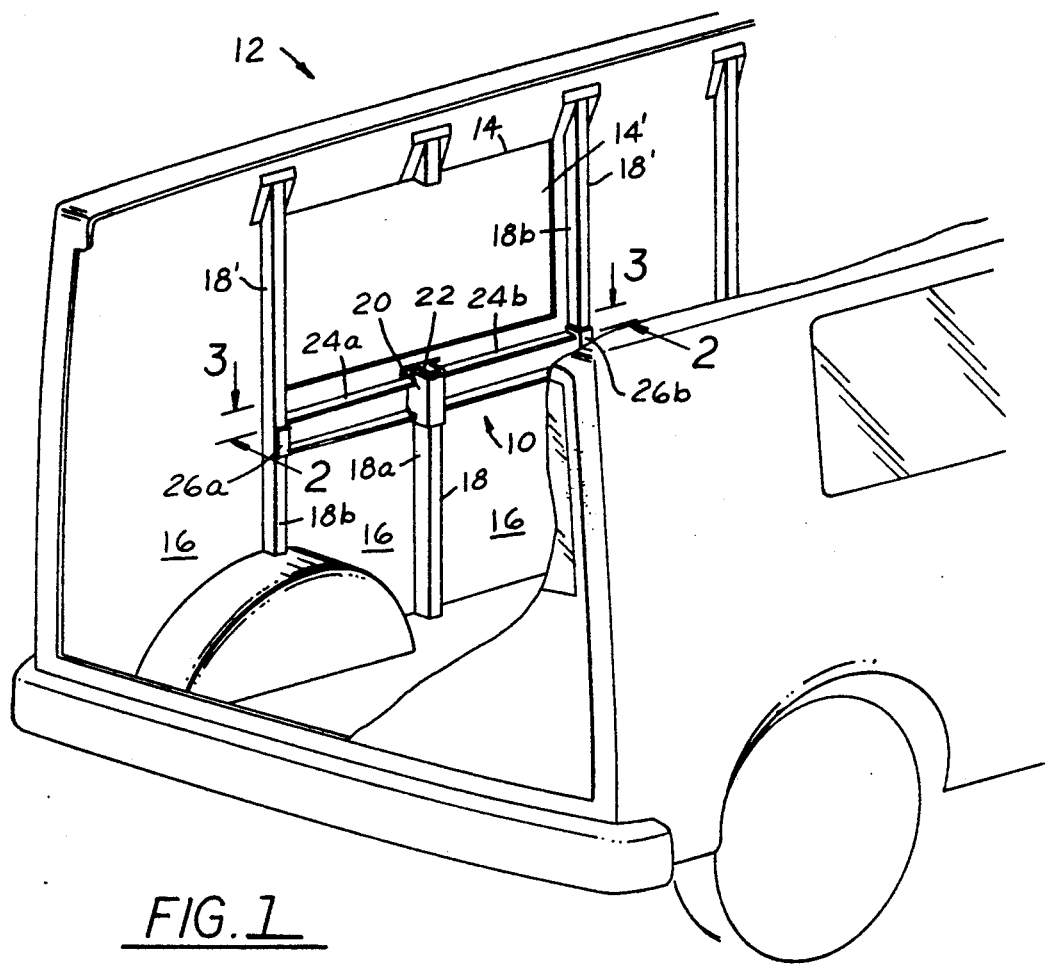
FIG. 1 is a part cut away perspective view, generally showing the van wall brace according to the present invention in operation.

Referring now to the Drawing, FIG. 1 shows the van wall brace 10 according to the present invention in operation in a van 12. As will be seen by reference to the figure, the van 12 has been modified by providing an aperture 14 so as to permit retrofitting of a window 14' into the wall 16 of the van. The process of providing the aperture 14 in the van wall 16 for the window 14' involved cutting the sheet metal of the wall, as well as a pillar 18. After the window has been installed the truncated pillar 18 no longer properly serves its originally intended function of rigidifying the wall. Accordingly, the van wall brace 10 is used to restore the lost rigidity.

Essentially, the van wall brace 10 is of an elongate shape, having a truncated pillar reciprocal contour 20 that is shaped to receive the exposed sides 18a of the truncated pillar 18 adjacent the severed end 22 thereof. Extending from either side of the truncated pillar reciprocal contour 20 are extension arms 24a and 24b, each of which terminating in an intact pillar reciprocal contour 26a, 26b, respectively shaped to engage sides 18b of an intact pillar 18' located adjacent the truncated pillar 18, on either side thereof. Upon connection of the van wall brace 10 to the truncated pillar 18 and its adjacent intact pillars 18', the van wall 16 shall have been restored to an acceptable level of strength and rigidity.

Figure 4:
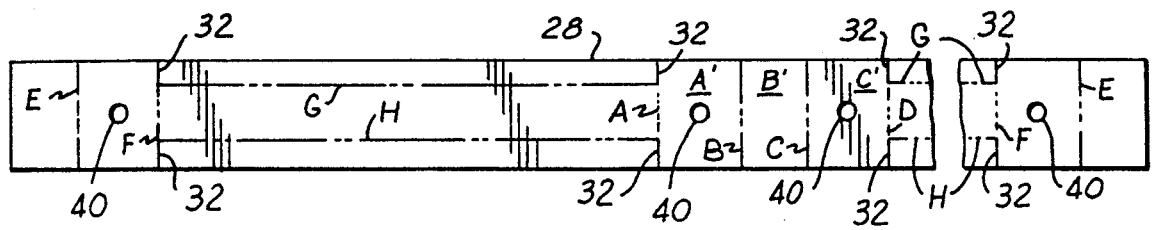
FIG. 4 is a top plan view of the van wall brace according of the present invention before stamping.
Figure 5:
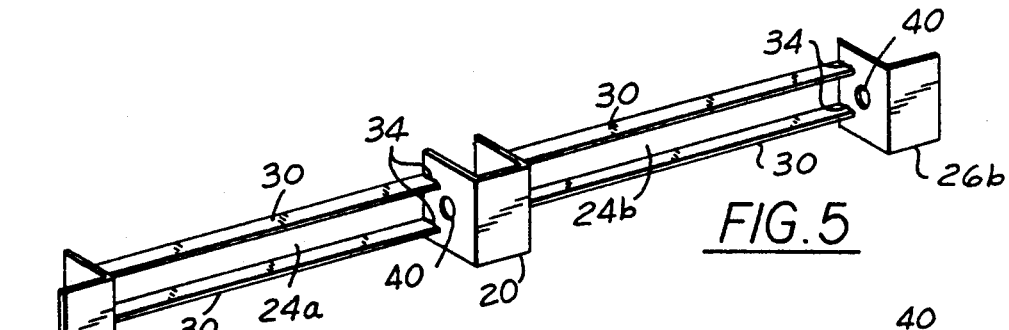
FIG. 5 is a perspective view of the van wall brace according to the present invention adapted particularly for Ford and Dodge vans.

The preferred construction of the van wall brace 10 will now be detailed with reference being made particularly to FIGS. 4 and 5. It is preferred to construct the van wall brace 10 from an elongate member 28 of rectangular shape and composed of heavy gauge sheet metal stock, as shown in FIG. 4. The locations of the pillars 18 and 18' are predetermined and the elongate member is then die cut and stamped to provide the van wall brace 10. In this regard, the truncated pillar reciprocal contour 20 is formed by stamping the elongate member 28 along lines A, B, C, and D so as to form a shape which reciprocally follows the shape of the truncated pillar 18 adjacent the severed end 22 thereof and allows for the truncated pillar reciprocal contour 20 to mate with all exposed sides of the truncated pillar 18 at surfaces A', B' and C'. In the example shown in FIGS. 4 and 5, this shape is that generally of a "U", as the shape of the truncated pillar 18 is generally of square cross-section. At either end of the elongate member 28, the intact pillar reciprocal contours 26a, 26b are formed by stamping the elongate member, respectively at each end, along lines E and F. Again, since intact pillars 18' are of generally square cross-section, the shape of the resulting intact pillar reciprocal contours are of a general "L" shape. Next, the arms 24a and 24b spanning the distance between the truncated pillar reciprocal contour 20 and the intact pillar reciprocal contours 26a and 26b are reinforced by the formation of flanges 30 formed along each longitudinal edge thereof at 90 degrees to the arms. The flanges 30 are formed by providing selective die cuts 32 in the elongate member 28 at locations adjacent respective pillar reciprocal contours 20, 26a, 26b, and by stamping a 90 degree fold in the elongate member along lines G and H, respectively. Thereupon, it is preferred to weld the edges 34 of each of the flanges 30 to the abutting respective pillar reciprocal contour 20, 26a, 26b, although for the sake of manufacturing simplicity, welding may be dispensed with.

Figure 2:
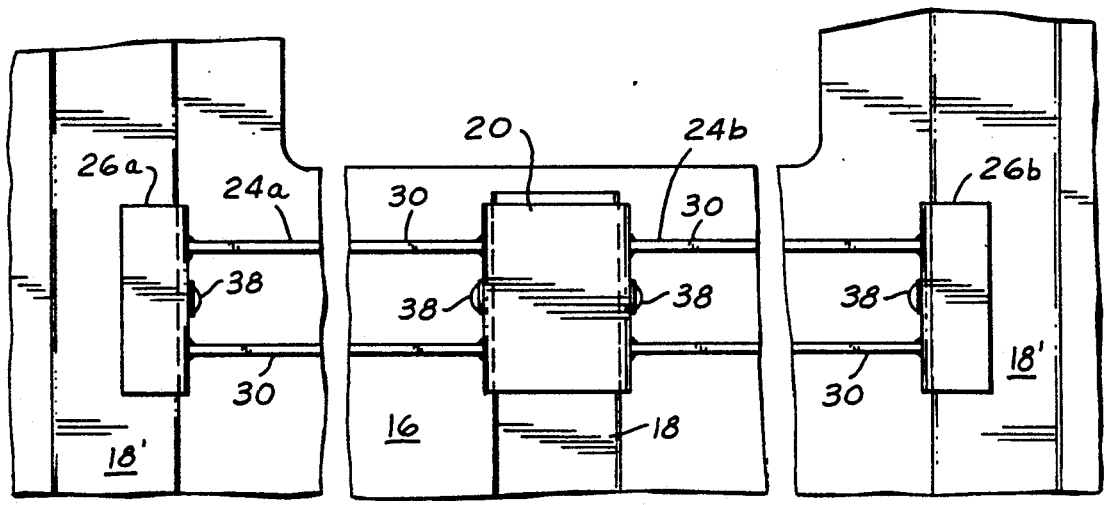
FIG. 2 is a side view of the van wall brace according to the present invention, as seen along lines 2—2 in FIG. 1.
Figure 3:
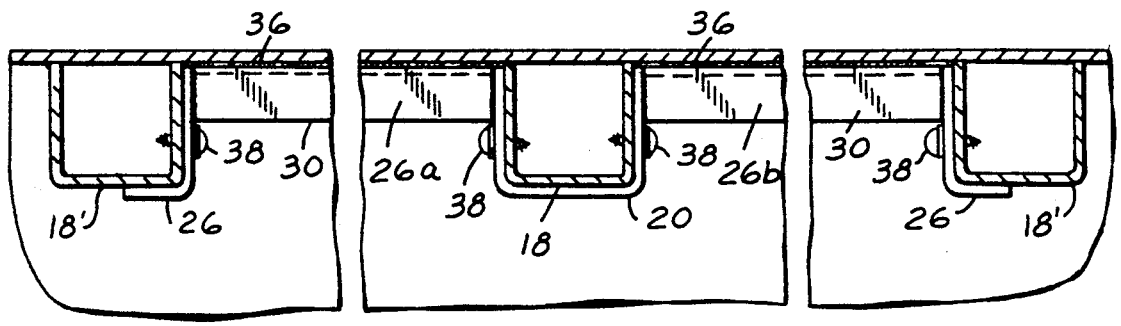
FIG. 3 is a part sectional top plan view of the van wall brace according to the present invention, as seen along lines 3—3 in FIG. 1.

With reference now to FIGS. 2 and 3, operation of the van wall brace 10 will now be described. With the van wall brace 10 having been formed from elongate member 28 as described hereinabove, the installer then places the van wall brace 10 against the van wall 16 so that the truncated pillar 18 matingly engages the truncated pillar reciprocal contour 20 and each of the intact pillar reciprocal contours 26a, 26b matingly engage the adjacent intact pillars 18'. It will be understood that: (1) the van wall brace 10 is structured to matingly engage each intact pillar 18' on each immediate side of the window aperture in the van wall, (2) the van wall brace is structured to matingly engage all exposed sides of the truncated pillar 18 in a wrap-around fashion, and (3) the van wall brace is structured so that the arms abut the wall of the van, where it is preferred to place a strip or bead of resilient material 36, such as urethane, between the van wall 16 and the arms 24a and 24b in order to prevent any possible vibration therebetween during operation of the van 12 (see FIG. 3). With the van wall brace situated on the exposed sides of the truncated pillar 18 proximate the severed end 22 thereof, as desired, the van wall brace 10 is thereupon secured to each of the exposed sides of the pillars 18, 18' by operation of a fastener, such as a screw 38 as shown in FIGS. 2 and 3, or by welding. In the event fastening is by screws, bolts or the like, apertures 40 may be provided in the van wall brace 10 as needed at the pillar reciprocal contours 20, 26a, 26b.

Figure 6:
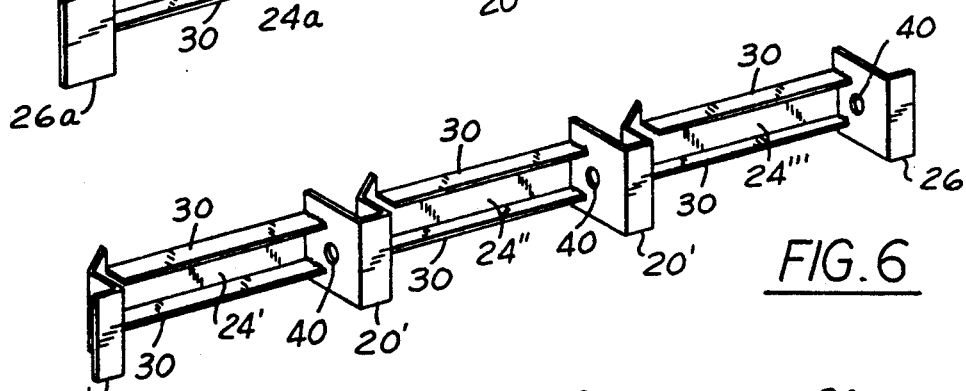
FIG. 6 is a perspective view of the van wall brace according to the present invention adapted particularly for Chevrolet and GMC vans.
Figure 7:
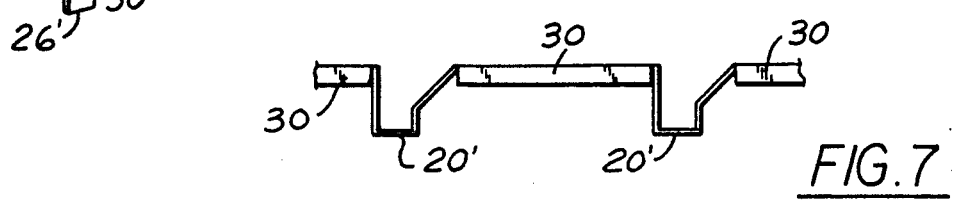
FIG. 7 is a partial top plan view of the van wall brace of FIG. 6, showing detail of the pillar reciprocal contours.

While the above described van wall brace 10 is suitable for many applications, it is intended that the disclosure herein be readily adaptable to a whole host of van interior structures. As an example of such an anticipated variation, please refer to FIGS. 6 and 7. In this variation example, the van wall brace 10 is modified to accommodate more than one truncated pillar, in that two truncated pillar reciprocal contours 20' have been stamped. Further, certain of the pillar reciprocal contours 20', 26' have a modified shape to engagingly mate with pillars that are of other than a square cross-section (as is presently utilized in Chevrolet and GMC vans). All such modifications, either to accommodate a number of truncated pillars or to matingly engage any shaped pillar, is accomplished by simply adjusting the die cutting and stamping operations that are described hereinabove.

To those skilled in the art to which this invention appertains, the above described preferred embodiment may be subject to change or modification. For instance, materials other than sheet metal could be substituted for the elongate member, and methods of manufacture other than die cutting and stamping can be used to form the van wall brace. As an example of this, if a polymer material were to be utilized for the van wall brace, it could be formed by injection molding. Further, the van wall brace 10 according to the present invention may be utilized in other applications besides vans, where the application utilizes pillars in a manner consonant with the disclosure hereinabove. Such change or modificaiton can be carried out without departing from the scope of the invention, which is intended to be limited only by the scope of the appended claims.

What is claimed is:

1. A brace for a wall, the wall having an aperture of a preselected size, the wall being connected to a plurality of pillars, each pillar of the plurality of pillars having exposed sides, the plurality of pillars including at least one truncated pillar having a severed end for accommodating the aperture, the plurality of pillars further including an intact pillar located at each side of the aperture, said brace comprising:

an elongate member having a first end and a second end;

at least one truncated pillar reciprocal contour formed in said elongate member between said first and second ends thereof, said at least one truncated pillar reciprocal contour being structured to matingly engage the sides of the at least one truncated pillar at a location substantially adjacent the severed end thereof; and two intact pillar reciprocal contours formed in said elongate member, one intact pillar reciprocal contour being located at each said end of said elongate member, each intact pillar reciprocal contour being structured to matingly engage the sides of a respective one of the intact pillars; wherein each intact pillar on each side of the aperture is matingly engagable by a respective intact pillar reciprocal contour; further wherein said at least one truncated pillar reciprocal contour and said two intact pillar reciprocal contours are structured so that the elongate member is locatable adjacent the wall at all locations between said at least one truncated pillar reciprocal contour and said two intact pillar reciprocal contours.

2. The brace of claim 1, further comprising at least one edge flange means integrally connected with said elongate member for strengthening said elongate member with respect to bending.

3. The brace of claim 2, wherein said elongate member is of a rectangular shape having an upper edge and a lower edge, said at least one flange means comprising:

an upper flange formed by a ninety degree bend in a selected portion of said elongate member along selected sections of said upper edge, said selected sections of said upper edge being located between each of said at least one truncated pillar reciprocal contour and said two intact pillar reciprocal contours; and a lower flange formed by a ninety degree bend in a selected portion of said elongate member along selected sections of said lower edge, said selected sections of said lower edge being located between each of said at least one truncated pillar reciprocal contour and said two intact pillar reciprocal contours.

4. The brace of claim 3, wherein each of said upper and lower edges is straight.

5. The brace of claim 3, wherein each of said upper and lower flanges is selectively welded to any of said at least one truncated pillar reciprocal contour and said two intact pillar reciprocal contours to which respectively abuts said upper and lower flanges.

6. The brace of claim 3, further comprising fastening means connected with said at least one truncated pillar reciprocal contour and with said two intact pillar reciprocal contours for fastening said at least one truncated pillar reciprocal contour to the at least one truncated pillar, and for fastening said two intact pillar reciprocal contours to the two intact pillars.

7. The brace of claim 3, further comprising resiliency means connected with said elongate member for selectively separating said elongate member from the wall.

* * * * *